June 11, 1968 L. O. GORDON 3,387,374
PERPENDICULARITY GAGE
Filed Nov. 9, 1966
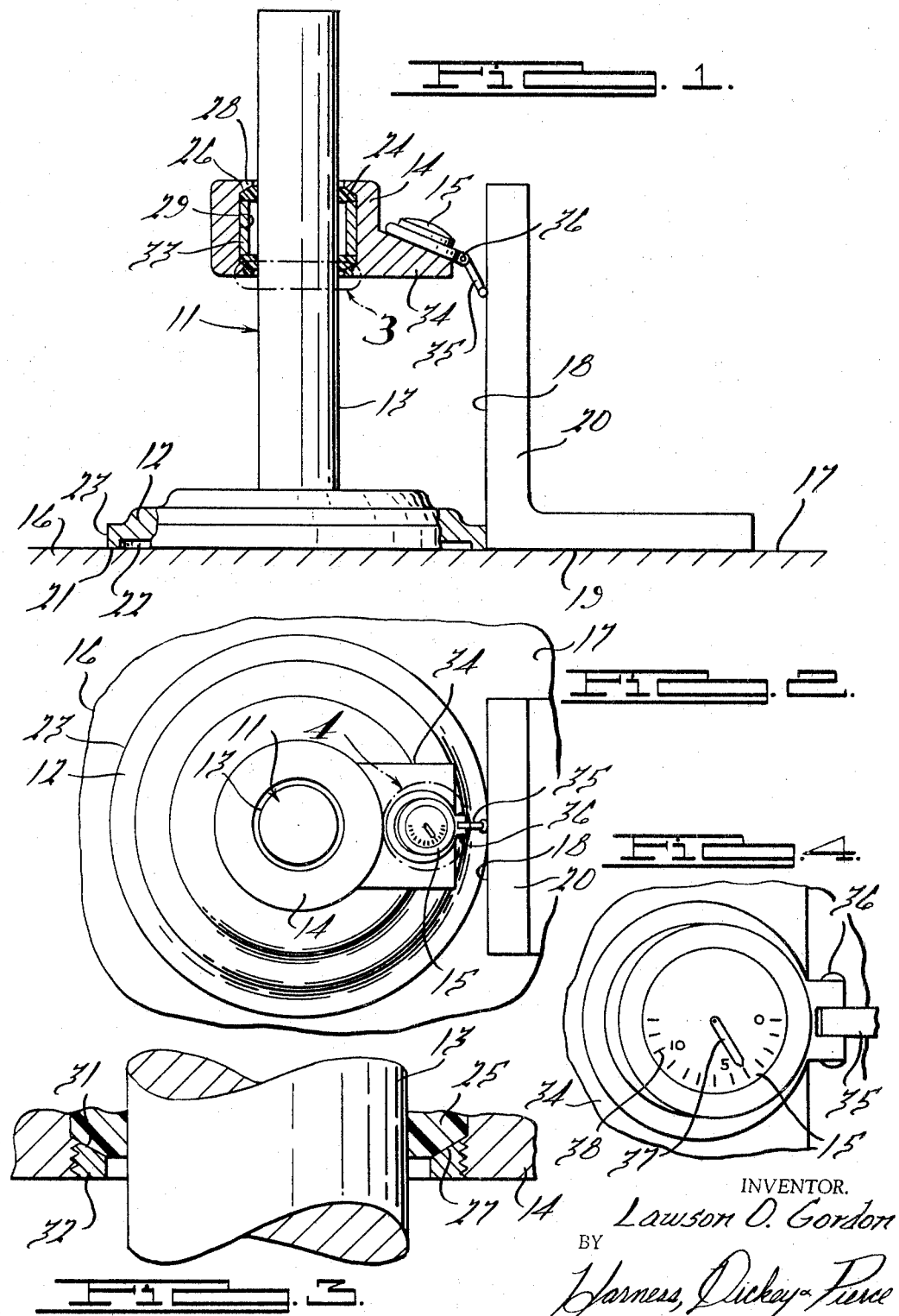
INVENTOR.
Lawson O. Gordon
BY
Harness, Dickey & Pierce
ATTORNEYS

United States Patent Office 3,387,374
Patented June 11, 1968

3,387,374
PERPENDICULARITY GAGE
Lawson O. Gordon, 22418 Rio Vista,
St. Clair Shores, Mich. 48081
Filed Nov. 9, 1966, Ser. No. 593,008
1 Claim. (Cl. 33—174)

ABSTRACT OF THE DISCLOSURE

A gauge fixture having a base with a flat undersurface and a cylindrical side surface which engages the lower part of a workpiece. The base centrally supports a post on which is slidably mounted a carrier for a dial indicator.

---

This invention relates to gauge fixtures and more particularly to devices for checking the relative angularity of two surfaces on a workpiece.

It is an object of the invention to provide a novel and improved gauge fixture which may be used in a cooperation with a flat surface to determine whether two surfaces on a workpiece are exactly at right angles to each other.

It is another object to provide an improved gauge fixture for this purpose which eliminates the need for Prussian blue conventionally used with cylinder squares, and instead, permits a much more efficient and less cumbersome method to be used, which is nevertheless highly accurate.

It is also an object to provide an improved gauge fixture of this nature which may be checked for its own accuracy in conjunction with a plane base surface.

Other objects, features and advantages of the present invention will become apparent from the subsequent description and the appended claim, taken in conjunction with the accompanying drawings, in which:

FIGURE 1 is a side elevational view, partially sectioned, showing the novel gauge fixture of this invention in position;

FIGURE 2 is a fragmentary top plan view of the construction of FIGURE 1;

FIGURE 3 is a fragmentary enlarged view, taken in the area marked 3 of FIGURE 1, and FIGURE 4 is a fragmentary plan view taken in the area marked 4 of FIGURE 2.

Briefly, the illustrated embodiment of the invention comprises a base resting on a plane surface and having an extremely flat annular surface and contact therewith. The base also has a cylindrical surface which is exactly at right angles to the flat surface. A cylindrical post extends upwardly from the base, the surface of this post being exactly coaxial with the cylindrical base surface. A member is slidably and rotatably mounted on the post and carries a dial indicator gauge with an outwardly extending feeler or sensing member.

In use, one flat surface of the workpiece is placed on the plane support so that the other flat surface faces the gauge fixture. The lower portion of the upstanding workpiece surface is placed against the cylindrical base surface of the fixture. By swinging the gauge supporting member back and forth first at the lower and then at the upper end of the upstanding workpiece surface, the difference, if any, in the low needle readings will indicate the degree to which this surface varies from a right angle relationship with the workpiece surface resting on the flat support.

Referring more particularly to the drawings, the gauge fixture is generally indicated at 11 and comprises a circular base 12, a cylindrical post 13 extending upwardly therefrom, a gaue supporting member 14 slidably and rotatably mounted on the base, and a dial indicator gauge 15 carried by member 14.

The gauge fixture is adapted to be used in conjunction with a support 16 having an extremely flat surface 17. The fixture is used to check the degree to which two surfaces 18 and 19 on a workpiece 20 are at right angles to each other. In the present instance, the workpiece is shown as an angular member, although it could have other shapes.

Base 12 of the gauge fixture is provided with an extremely flat surface 21 on the underside thereof, this surface surrounding a recess 22 in the bottom of the base. Surface 21 is adapted to rest on surface 17 in full engagement therewith.

Base 12 is also provided with a cylindrical surface 23 which is exactly at right angles to surface 21 and extends upwardly from the bottom of the base. Surface 23 is adapted to engage the lower portion of workpiece surface 18.

Post 13 has a cylindrical surface which is exactly coaxial with surface 23. Gauge supporting member 14 is of annular shape, surrounding post 13 and carrying a pair of frictional gripping members 24 and 25 adjacent the upper and lower portions thereof. As seen in FIGURES 1 and 3, members 24 and 25 have sloping upper and lower surfaces 26 and 27, respectively. Surface 26 is engageable with a complementary surface on an inwardly extending portion 28 of member 14, at the upper end of a central bore 29. In a similar manner, surface 27 of gripping member 25 engages the sloping annular surface 31 of an adjusting screw 32 which is threadably mounted in the lower end of bore 29. An annular spacer 33 extends between the facing surfaces of members 24 and 25 respectively.

The inner diameters of members 24 and 25 are such that they will frictionally grip post 13, the arrangement being such that adjustment of screw 32 will result in tightening or loosening the grip of members 24 and 25 on post 13. In this manner, member 14 may be slid axially up or down to any position on post 13 and will stay in this position. Member 14 may also be rocked back and forth at any given height around the axis of post 13.

Member 14 also has a platform 34 extending outwardly from the lower portion thereof, as seen in FIGURE 1. Dial indicator gauge 15 is mounted on this platform and comprises a conventional type of indicator which carries a sensing member or a feeler 35 pivoted at 36 to the housing of the gauge. Feeler 35 is connected to a pivoted pointer 37 which moves along an adjustable scale 38, as seen in FIGURE 4.

In operation, surface 19 of workpiece 20 will be placed on support 16. Surface 21 of base 12 will then be placed on the support, and surface 23 of the base brought up against the lower portion of workpiece surface 18.

Member 14 is slid downwardly on post 13 so that feeler 35 will engage the lower portion of surface 18. Member 14 will then be rocked back and forth about the axis of post 13 and will be centered at the position where needle 37 of gauge 15 reads at its lowest value, that is, with the feeler in its most depressed position. Dial 38 may then be set so that this needle reading will be zero.

Member 14 will then be moved upwardly on post 13 to a position in which feeler 35 engages the upper portion in surface 18. Member 14 will again be rocked back and forth to obtain a minimum reading of needle 37. If this is different than zero, it will mean that surface 18 is not exactly at right angles to surface 19 but slopes one way or the other from the vertical, depending on the needle reading.

Similarly, intermediate readings may also be taken between the upper and lower portions of surface 18.

Moreover, readings may be taken at one side or the other of surface 18 by moving unit 11 with respect to support 16 into or out of the paper, as seen in FIGURE 1.

Fixture 11 may also be checked for accuracy, that is, to see whether post 13 is exactly at right angles to base surface 21. This may be done by first engaging one portion of surface 18 with surface 23, getting the minimum needle reading by rocking member 14 back and forth, and then holding member 14 against rotation at this minimum needle setting while rotating base 12, say, 180° so that surface 18 will engage the diametrically opposite portion of surface 23. If there is a difference in the readings of the gauge between the two angular positions of base 12, it will indicate that post 13 is not exactly at right angles to surface 21. This, of course, assumes that surface 17 is perfectly flat.

It will thus be seen that a novel and improved gauge fixture has been provided which permits right angle surface checking with a minimum of trouble but with high efficiency and accuracy.

While it will be apparent that the preferred embodiment of the invention disclosed is well calculated to fulfill the objects above stated, it will be appreciated that the invention is susceptible to modification, variation and change without departing from the proper scope or fair meaning of the subjoined claim.

What is claimed is:

1. In a gauge unit for checking the relative angularity of two surfaces on a workpiece, a base having a flat undersurface, a second surface on said base at right angles to said flat undersurface and extending upwardly therefrom, said second surface being circularly cylindrical and adapted to engage the lower portion of a workpiece surface to be checked, a cylindrical post extending upwardly from said base, a gauge-supporting member slidably and rotatably carried by said post, said member having axially spaced annular frictional gripping means for holding said member at any axially adjusted position along the length of said post and for supporting said member at such adjusted position for rotational movement about the post axis, means for adjusting the pressure with which said gripping means engage said post, a dial indicator gauge carried by said member and having an indicator needle, and a feeler on said gauge extending outwardly from said post beyond said second surface, whereby said rotational movement of the member when said feeler engages the surface of a workpiece will result in a minimum reading for said needle at one point in said rotational movement.

References Cited

UNITED STATES PATENTS

| | | | |
|---|---|---|---|
| 2,131,762 | 10/1938 | Smith | 308—238 |
| 3,273,252 | 9/1966 | Bunge | 33—174 |
| 3,271,871 | 9/1966 | Foscarota | 33—174 |

LEONARD FORMAN, *Primary Examiner.*

J. M. FREED, *Assistant Examiner.*